A. D. HARRISON.
APPARATUS FOR THE TRANSMISSION OR EXCHANGE OF HEAT BETWEEN FLUIDS.
APPLICATION FILED FEB. 12, 1915.
1,170,902.
Patented Feb. 8, 1916.
4 SHEETS—SHEET 1.
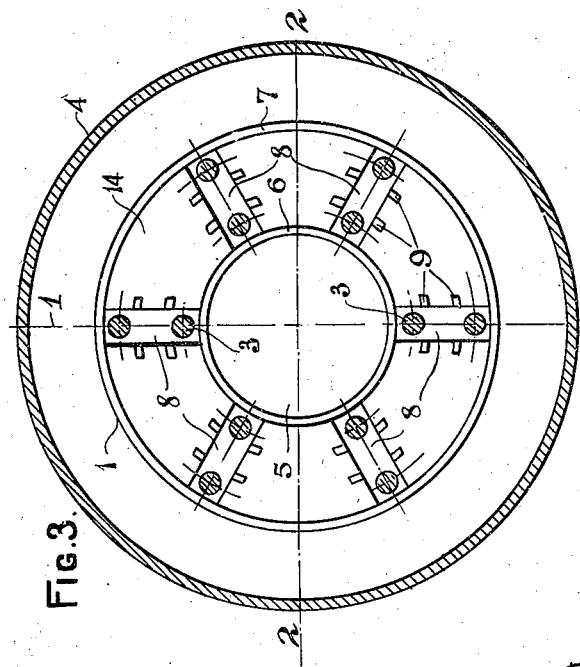
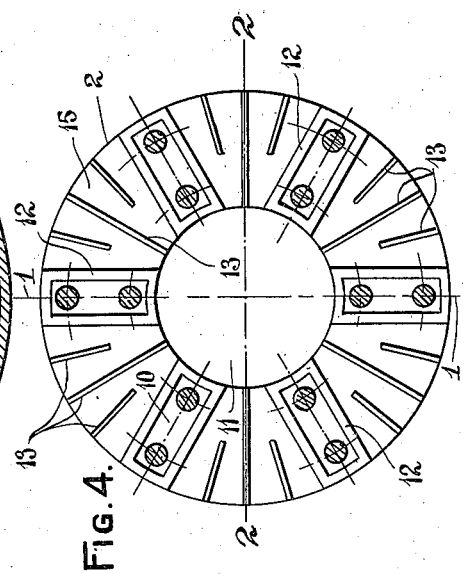
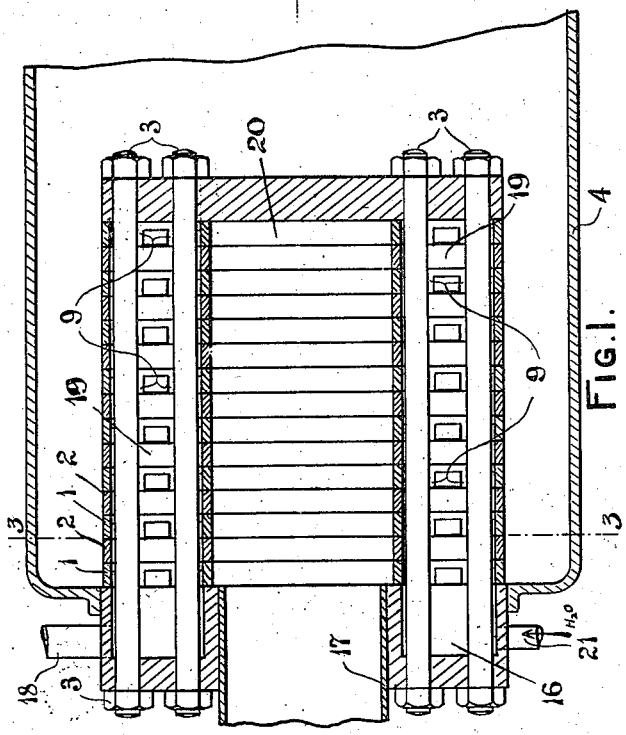
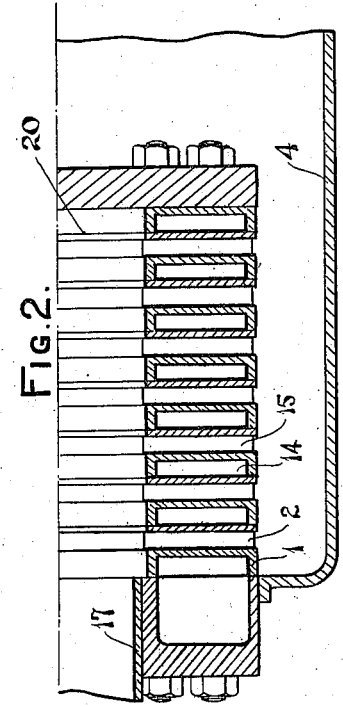
WITNESSES.
INVENTOR.
Albert Dex Harrison.
BY

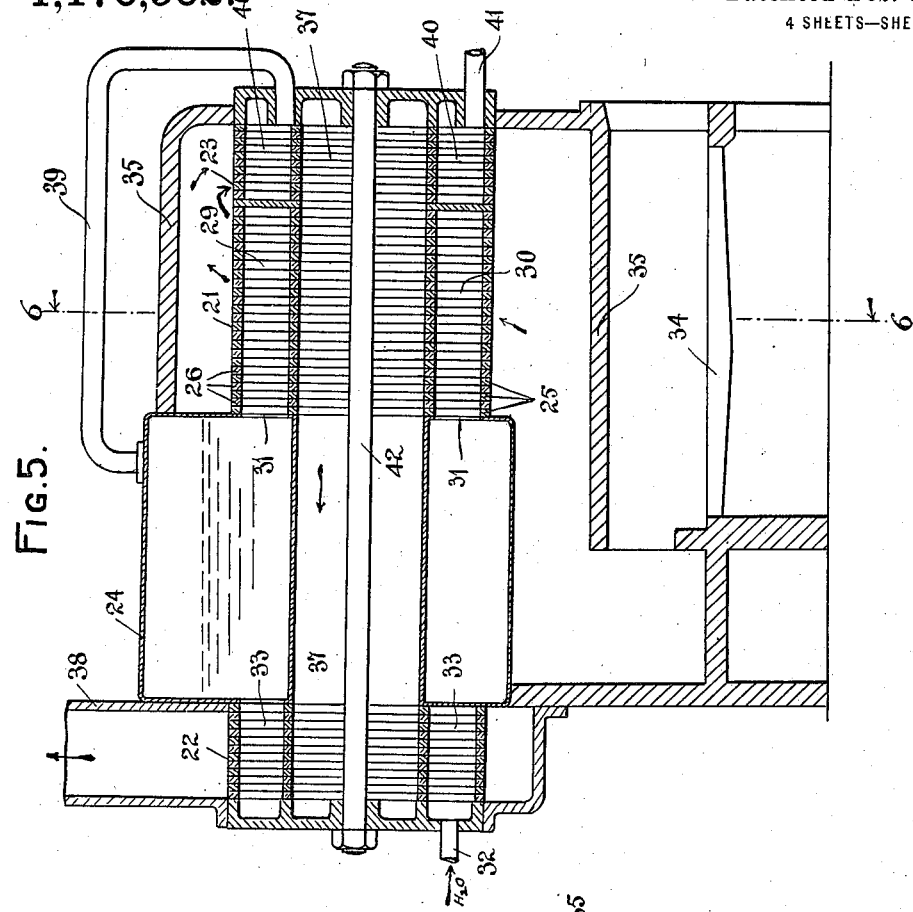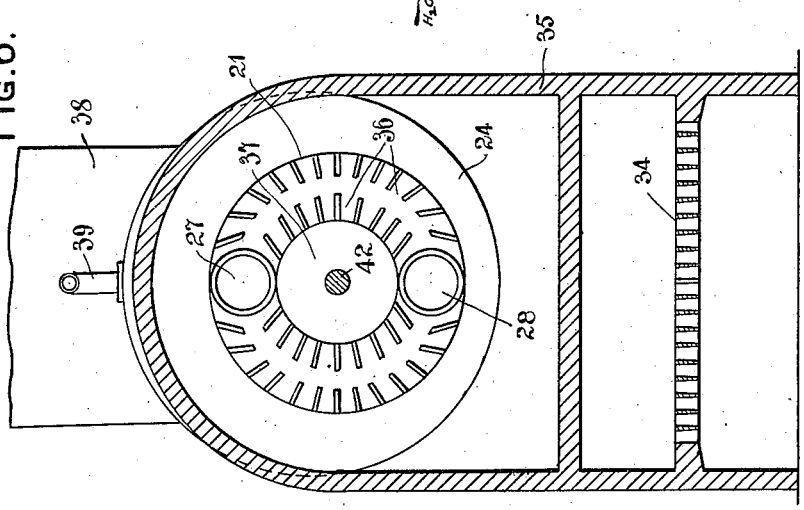

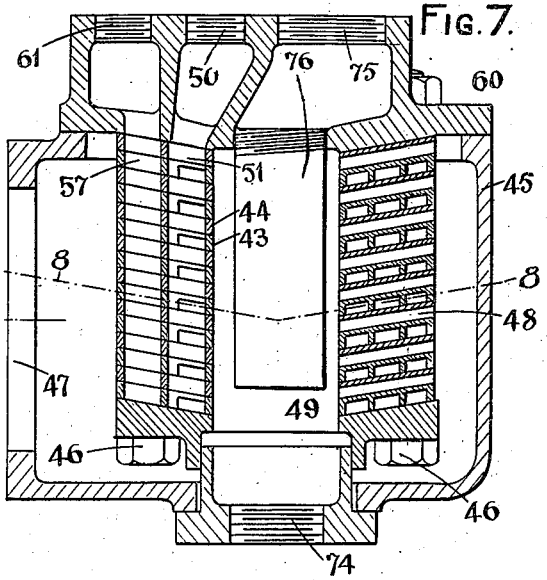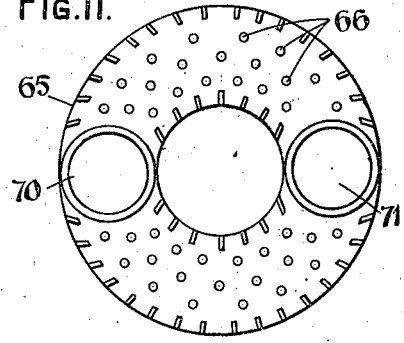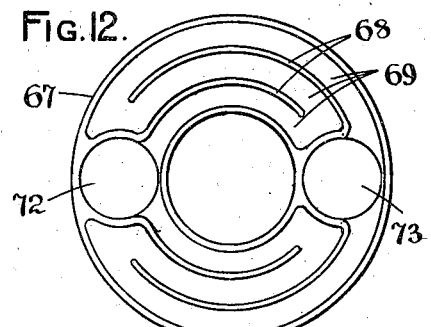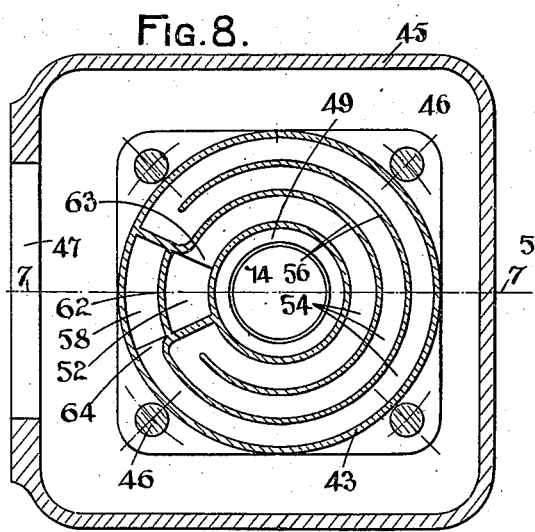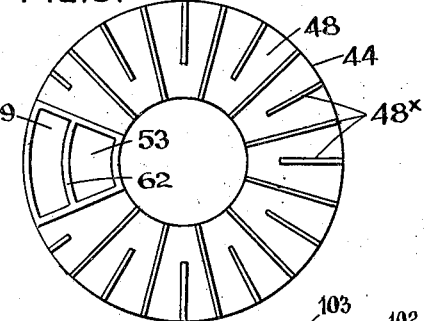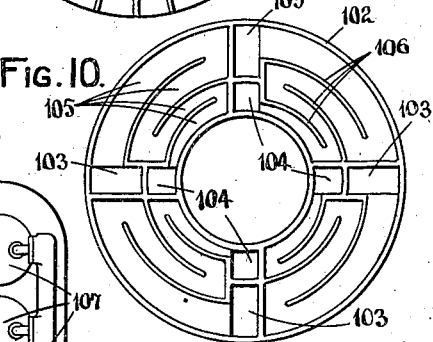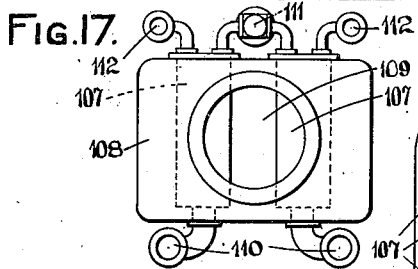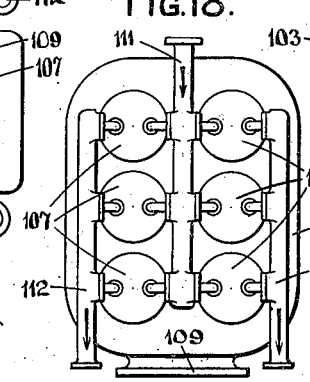

A. D. HARRISON.
APPARATUS FOR THE TRANSMISSION OR EXCHANGE OF HEAT BETWEEN FLUIDS.
APPLICATION FILED FEB. 12, 1915.
1,170,902.
Patented Feb. 8, 1916.
4 SHEETS—SHEET 4.
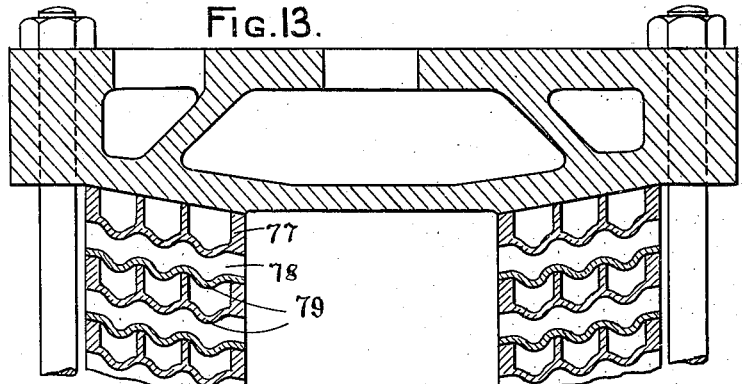
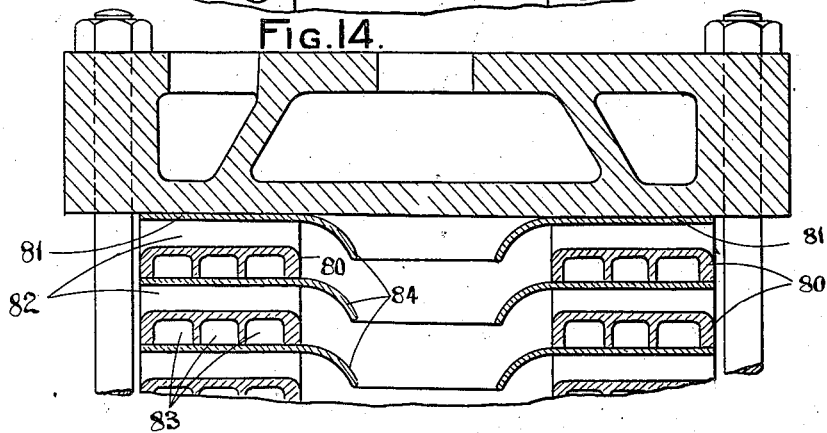
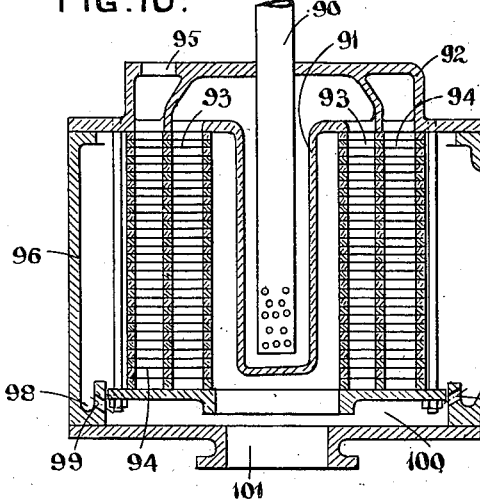
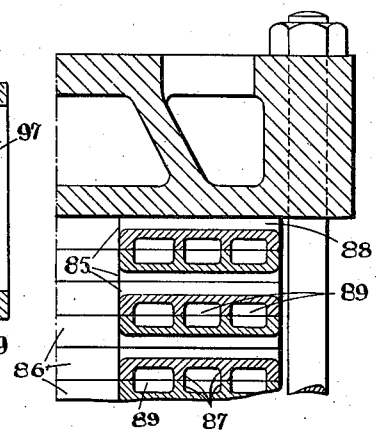
WITNESSES.
INVENTOR.
Albert Dex Harrison.

UNITED STATES PATENT OFFICE.

ALBERT DEX HARRISON, OF WOLVERHAMPTON, ENGLAND.

APPARATUS FOR THE TRANSMISSION OR EXCHANGE OF HEAT BETWEEN FLUIDS.

1,170,902.     Specification of Letters Patent.    Patented Feb. 8, 1916.

Application filed February 12, 1915. Serial No. 7,709.

*To all whom it may concern:*

Be it known that I, ALBERT DEX HARRISON, a subject of His Majesty the King of Great Britain and Ireland, residing at Wolverhampton, England, have invented a new and useful Improvement in Apparatus for the Transmission or Exchange of Heat Between Fluids, of which the following is a specification.

This invention relates to apparatus such as steam generators, heaters, evaporators, condensers and the like for the transmission or exchange of heat between fluids and consists, as reduced to practice, in the provision of a series of plates clamped together between end plates and provided with flanges and central or approximately central and eccentric openings and baffles thereon so that a series of chambers are formed between the plates through which the fluids are circulated or passed, means being provided for preventing the fluids from coming into actual contact with each other.

When a gaseous fluid undergoes a change in temperature at constant pressure there is a corresponding change in volume. For a perfect gas the change in volume varies in direct proportion to the absolute temperature. Saturated steam however, is so unstable that the smallest drop in temperature results in its complete condensation and its volume becomes that of the water of condensation. In such apparatus as heretofore constructed, no provision has been made for the change in volume which occurs when a gaseous fluid is heated or cooled in passing through the apparatus, hence the fluid must pass through the apparatus with an increasing velocity if being heated, or with a decreasing velocity if being cooled. For example, in passing steam through a condenser, the volume of the steam at the inlet of the apparatus may be 1500 times the volume of the air and water withdrawn from the apparatus by the air pump. In the case of a steam generator, if for example the temperatures of the heating gases at the inlet and outlet respectively are 2500° F. and 500° F., the reduction in volume of said gases in passing through the apparatus would be 68%, and in consequence the velocity of said gases at the outlet would be ⅓rd the velocity at the entrance.

The present invention has for its object to provide an apparatus wherein the change in volume of the fluid passing therethrough can be compensated by a change in the area of the passage or passages in the apparatus. Thus in the case of a steam condenser constructed according to this invention, the passages for the steam are gradually reduced as the condensation proceeds less cooling surface being required as less steam remains to be condensed. Therefore the cooling surface provided can be fully utilized. Similarly, in a steam generator the hot gas passages have a larger area at the entrance than at the outlet. Comparing this with a passage of constant area, this construction allows a lower velocity at the entrance, and a higher velocity at the outlet, assuming the same mean velocity. Thus there is more time at the beginning for the hot gases to give up their heat while at the end the higher velocity produces a greater scrubbing action on the surface of the plate and results in a greater loss of heat to the gases per unit area of surface. Further, the power required to force the fluid through the apparatus will be correspondingly less as the maximum velocity is reduced.

To enable the invention to be fully understood it will now be described by reference to the accompanying drawings in which:

Figure 1 is a sectional elevation, taken on the line 1—1 of Figs. 3 and 4, of one form of steam generator constructed according to this invention. Fig. 2 is a half sectional view, taken on the line 2—2 of Figs. 3 and 4. Fig. 3 is a sectional end view of same on line 3—3 Fig. 1, showing one of the plate elements thereof, and, Fig. 4 is a front view of another plate element of same. Fig. 5 is a sectional elevation and Fig. 6 is a sectional end view on line 6—6 of Fig. 5, of an apparatus similar to that shown in Figs. 1 to 4 combined with a superheater, a feed water heater and a vessel containing steam and water. Fig. 7 is a sectional elevation on line 7—7 of Fig. 8, and Fig. 8 is a sectional plan view on line 8—8 of Fig. 7 of one form of condenser constructed according to this invention. Fig. 9 shows the construction of the second plate element corresponding to that shown in Fig. 8. Figs. 10, 11 and 12 show modified constructions of plate elements for a condenser. Figs. 13 and 14 are sectional elevations showing parts of two modified forms of condensers.

Fig. 15 is a sectional elevation of a modified plate element, showing part of a condenser. Fig. 16 is a sectional elevation on a reduced scale of still another form of condenser, and Figs. 17 and 18 are end elevation and plan respectively of a condenser illustrating a plurality of heat exchanging elements combined in one casing.

Referring first to Figs. 1 to 4. The heat exchanging element for a steam generator is built up of a series of plate elements 1, 2, clamped together by bolts 3 and arranged within an outer casing 4. Fig. 3 shows the face of one of the plate elements 1 and Fig. 4 the face of one of the plate elements 2. The plate 1 is flat on the back and has a central opening 5, surrounded by a flange 6 and is also provided at its periphery with a flange 7. A series of eccentrically disposed radial openings 8 extend from the flange 6 to flange 7 having lugs 9 at their edges. The plate 2 (Fig. 4) is adapted to fit over plate 1, its flat back resting on the flanges 6, 7, and lugs 9 thereof. It is also provided with eccentrically disposed radial openings 10 and a central opening 11 coinciding with the openings 8 and 5 respectively in plate 1. The openings 10 are surrounded by flanges 12 so that the said openings are cut off from communication with the central opening 11 or spaces communicating therewith. Baffles 13 are provided in the space between the flanges 12. It will be obvious that when the plate 2 is placed with its flat back upon the face of plate 1 a space 14 will be formed between the two plates said space communicating with the radial openings 8 and 10 but not with the central opening 5 or with the outer casing 4. A second plate similar to plate 1 is then placed with its flat back resting upon the face of plate 2, so that between the plate 2 and the second plate 1, a series of spaces 15 are formed communicating with the central opening 11 in the plates and with the outer casing 4, but not with the radial openings 8 and 10 in the plates, said spaces diminishing in area toward the central openings in the plates.

The heat exchanging element is built up by arranging the desired number of plates 1 and 2 alternately in the above manner, the clamping bolts 3 passing through the radial openings in the series as shown and serving to clamp the plates tightly together preventing leakage through the various joints. The feed water for the generator enters a header 16 of the series by way of pipe 21, and the water passes into the spaces 14 through the passages 19 formed by the radial openings 8 and 10 in the plates 1 and 2. The hot gases from the furnace enter the casing 4 and pass through the spaces 15 between the water containing plates into the central passage 20 formed by the central openings 5 and 11 leading to the flue 17. The steam passes off through the pipe 18 connected with the header 16. With this arrangement it will be seen that the hot furnace gases pass to the flue through a series of passages of gradually diminishing area.

Figs. 5 and 6 show a steam generator having a heat exchanging element 21 as described with reference to Figs. 1 to 4 but combined with a feed water heater element 22, superheater element 23 and vessel 24 for the storage of steam and water. In this arrangement the heat exchanging element 21 is constructed of plates 25, 26, and is built up in a similar manner to the element shown in Figs. 1 to 4, the plates 25, 26, are however provided with two round openings 27, 28, in place of the radial openings 8 and 10, such openings forming passages 29 and 30 in the built up element. These passages 29 and 30 are connected at 31 to the storage vessel 24. The feed water is admitted by the pipe 32 and passes through the element 22 which is preferably constructed with plates similar to those for use in a condenser (as shown in Fig. 12) as hereinafter described and having the upper water space 33 in communication with the vessel 24. The feed water is thus heated on its way to the storage vessel 24. The hot gases from the grate 34 of the furnace 35 strike the underside of vessel 24 and are drawn through the passages 36 of decreasing area formed in the plates 26 arranged between the water containing plates 25 in the element 21 and between the steam containing plates of the super-heater 23 into the central flue 37 and finally between the water containing plates of the feed heater 22 a fan being arranged in the uptake 38 if desired. The steam passes from the top of the vessel 24 through the pipe 39 into the superheater 23 which is preferably constructed with plates similar to those for use in a condenser to be hereinafter described with reference to Fig. 12, the steam passing through the passages 40, the corresponding passages in the elements 21 and 22 being occupied by the feed water. The steam passes through this superheater at a high velocity and passes out through the pipe 41. In this construction the water level in the vessel 24 is maintained above the top of the plates comprising the element 21 thus preventing overheating or burning of said plates. The plates in this design are shown to be held together by one large bolt 42 passing through the center but it is obvious that a number of bolts could be used, which bolts could pass either through the central passage or flue 37 or through radial openings as shown in Figs. 1 to 4.

Figs. 7, 8 and 9, show the invention applied to a condenser. The plates 43, 44, correspond to plates 1, 2, respectively of the steam generator shown in Figs. 1 to 4, said plates 43, 44, however are shown to be of a dished shape sloping in the direction of flow of the steam which shape also assists in the drainage of the water of condensation. The plates 43, 44, are arranged within a casing 45 by clamping bolts 46 which in this case do not necessarily pass through the plates. The steam enters the casing 45 at 47, and passes through the spaces 48 of decreasing area, formed by the baffles 48× on the plate 44, into the central passage 49. The condensing water enters through the opening 50 into the radial passage 51 formed by the openings 52, 53, in the plates 43, 44, and then passes around the plate 43 through the passages 54 formed by the guiding flanges or projections 56. The water can thus be made to travel in a zig-zag, sinuous or other desired path across the surface of the plate, into the radial passage 57 formed by the openings 58, 59, in the plates 43, 44. The water passes out from the top end plate or header 60 through an opening 61. The radial opening in each plate is divided into two parts by a bridge piece 62 forming the openings 52, 58 and 53, 59, the flanges surrounding said openings in the plates 43, being cut away as shown at 63 and 64. By suitably arranging the guiding flanges 56 on alternate plates, the water in the alternate plates can be caused to travel in opposite directions thus securing a more equable condensation.

Fig. 11 shows the construction of a plate element 65 corresponding to the element 44 shown in Fig. 9, but in which the baffles for the steam, extend only a short distance from the outer edge and from the central opening, the intermediate space being provided with projections 66 formed on the surface of the plate, said baffles causing the steam to take a sinuous course across the surface of the plate.

Fig. 12 shows a plate element 67 adapted to be used alternately with the element 65 shown in Fig. 11 and on which are formed the guiding flanges 68 producing the water passages 69. Figs. 11 and 12 also show the plates provided with circular openings 70, 71, and 72, 73, which have the same function as the radial openings 52, 58, and 53, 59, formed in the plates shown in Figs. 8 and 9, the header 60 being formed accordingly. In Fig. 7 separate outlets are shown for the wet and dry vacuum pumps, the water of condensation being drawn away from the connection 74 at the bottom of the central passage 49 while the air is drawn away from the header 60 through a connection 75. An open ended pipe 76 adapted to be located within the central passage 49 (as shown in Fig. 7) may be secured in the header 60 so that the air contained in the steam may be drawn off from the lower end of such central passage.

Fig. 13 shows the upper portion of a condenser of a construction similar to that shown in Fig. 7 with the exception that the plates 77, 78, are formed with a series of concentric corrugations 79. This construction causes the steam to take a wave like course and the centrifugal force created tends to cause the steam to strike the surfaces of the plates.

Fig. 14 shows a further construction for a condenser in which both sets of projections are formed on the one plate 80 which when placed alternately with a plain plate 81 produces the passages 82 for the steam on one side of the plate 80 and the sinuous passage 83 for the water on the other side. The plate 81 is dished around the central opening as shown at 84 so that when placed in position its serves to deflect the condensed steam which is thrown down to the bottom of the central opening where the water of condensation is drawn away by the vacuum pump.

If desired instead of the plates being formed as above described with reference to Fig. 14, both plates may be made similar in construction to the plate 80, but the depth of the radial baffles 85 on the one side of the plate 86 and the concentric baffles 87 on the other side of said plate may be halved so that when a plate of similar construction is placed on top, with the similarly formed faces in contact with each other, the required passages 88, 89, for the fluids will be formed by the combined plates, as shown in Fig. 15.

The form of condenser shown in Fig. 16 is provided with a central pipe 90 which conveys the condensing water to the bottom of a surrounding tube 91 preferably fluted on the outside and attached to the header 92. The water flows up between the concentric tubes 90 and 91 and thence into the inner conduits 93 and by the passages in the plates, as previously described, into the outer conduits 94 and so to the water outlet 95. The steam enters the casing 96 at opening 97 which opening can be offset with regard to the plates. The casing is provided with vertical flutes so that the water in the steam when thrown by centrifugal force against the casing is caught and falls down into the channel 98 provided in the bottom of the casing and is conveyed by suitably sized holes or slots 99 into the space 100 and so to the vacuum pump by opening 101. Consequently the water already contained in the steam is not necessarily passed through the condenser. Any particle of steam uncondensed in passing through the spaces between the water carrying plates strikes the fluted tube 91 and is at once condensed on the cold surface thereof and falls into the opening 101, the water of condensation and air are thereby cooled in their passage to the vacuum pump or pumps.

The baffles 13, 48ˣ and 66 shown in Figs. 4, 9 and 11, serve two purposes. In the first place they serve to direct, split up or impede the flow of the fluid and in the second place they serve to support the plate against collapse which tendency is caused by the difference in pressure usually existing between the two fluids. The baffles and flanges may be cast, pressed or otherwise produced on the surface of the plates. A form of plate herein described as being suitable for a steam generator could also be used for a condenser and vice versa and other apparatus for the interchange of heat between two or more fluids can be arranged and adapted from the specific types of plates herein described or by modifications therefrom.

In some cases it may be desirable to provide a decreasing or increasing area for the passage of the fluid which is more conveniently introduced through the end plates and Fig. 10 shows a construction which provides this. The plate 102 is shown furnished with four radial openings 103 and four radial openings 104 and if the fluid is being cooled it is introduced between the plates through the passage formed by the openings 103 and traverses a channel 105 of gradually decreasing area formed by the eccentrically disposed baffles 106 to the passage formed by the openings 104.

In Fig. 5 the feed water heater element 22 is shown so that the gases pass through in the reverse direction to that called for by the fact that the gases are being cooled. This could be obviated by arranging the plates of such element in a similar manner to the condenser shown in Fig. 16 and passing the flue gases through the apparatus by connecting flange 97 to the flue on the storage vessel. Where small space is desirable for the apparatus the arrangement in Fig. 5 is to be preferred.

In Figs. 17 and 18 a form of condensing apparatus is illustrated in which a plurality of heat exchanging elements 107 are arranged in a single casing 108. The steam enters the casing 108 through an opening 109 passes through the passages of decreasing area formed in the elements 107, the water of condensation being drawn off through the outlet pipes 110. The cooling water enters the elements 107 through the pipe 111 circulates through the eccentrically disposed passages formed in the plates and passes out through the pipe 112. The elements 107 are preferably arranged in the casing 108 in parallel so that one or more of such elements may be disconnected from the pipes 110, 111 and 112, for renewal, cleansing or other purpose without affecting or preventing the continued operation of the remaining elements.

It is obvious that modifications may be made in details without departing from the spirit and scope of this invention. For instance the plates need not necessarily be circular but may be rectangular or with any number of sides.

What I claim is:—

1. In an apparatus for the transmission or exchange of heat between fluids, a plurality of plates constructed and arranged so that the heating fluid or the fluid to be cooled is caused to pass through radially disposed spaces of gradually decreasing area.

2. In an apparatus for the transmission or exchange of heat between fluids, means located therein comprising passages of gradually decreasing area radiating from the center of the apparatus through which the heating fluid or fluid to be cooled is caused to pass.

3. In an apparatus for the transmission or exchange of heat between fluids, means located therein comprising passages of gradually decreasing area radiating from the center of the apparatus through which the heating fluid or fluid to be cooled is caused to pass, and passages through which the fluid to be heated or the cooling fluid is caused to pass, part of such second named passages being disposed at right angles to the radially disposed passages, the other part being arranged alternately with such radially disposed passages.

4. In an apparatus for the transmission or exchange of heat between fluids, two series of plates eccentrically disposed openings provided in both series, radially disposed passages of gradually decreasing width toward the center of and formed on each plate of one series, one series being placed alternately with the plates of the other series, the eccentrically disposed openings in one series coinciding with the eccentrically disposed openings of the other series, thereby forming passages through the combined plates, means for securing said plates in assembled relation, a chamber exterior to and in which said plates are arranged, and a passage formed by the interior edges of said plates.

5. In an apparatus for the transmission or exchange of heat between fluids, a series of plates, a central opening formed in each of such plates, eccentrically disposed openings provided in each plate, concentric flanges formed around the central opening and around the peripheral edge of each plate, flanges formed around said eccentrically disposed openings, radially disposed passages of varying width formed on said plates, said last named flanges and radially disposed passages being formed on the opposite side of said plates to said concentric flanges, a second series of plates, a central opening formed in each of such plates eccentrically disposed openings provided in each plate, the two series of plates being assembled so that the plates of one series alternate with the plates of the other series, the eccentrically disposed openings in one series coinciding with the eccentrically disposed openings in the other series thereby forming passages through the combined plates, and means for securing such plates in assembled relation.

6. In an apparatus for the transmission or exchange of heat between fluids, a series of plates, a central opening formed in each of such plates, eccentrically disposed openings provided in each plate, concentric flanges formed around the central opening and around the peripheral edge of each plate, flanges formed around said eccentrically disposed openings, radially disposed passages of varying width formed on said plates, said last named flanges and radially disposed passages being formed on the opposite side of said plates to said concentric flanges, a second series of plates, a centrally arranged dished opening formed in each of such plates eccentrically disposed openings provided in each plate, the two series of plates being assembled so that the plates of one series alternate with the plates of the other series, the eccentrically disposed openings in one series coinciding with the eccentrically disposed openings in the other series thereby forming passages through the combined plates, and means for securing such plates in assembled relation.

7. In an apparatus for the transmission or exchange of heat between fluids, a series of plates, eccentrically disposed openings provided in such plates flanges formed around the inner and outer edges on one side of the plates, flanges formed around said eccentrically disposed openings on the other side of said plates, radially disposed passages of varying width formed on the last named side of said plates, a second series of plates, eccentrically disposed openings provided in such plates, the two series of plates being assembled so that the plates of one series alternate with the plates of the other series, the eccentrically disposed openings in one series coinciding with the eccentrically disposed openings in the other series, thereby forming passages through the combined plates, and means for securing such plates in assembled relation.

8. An individual plate element for the purpose described having an approximately central through passage, a passage of varying width between the interior and exterior edges of such plate, and eccentrically disposed openings through such plate.

9. An individual plate element for the purpose described having a centrally disposed opening eccentrically disposed openings, flanges formed around the last named openings and passages of varying width between said centrally disposed opening and the exterior edge of said plate.

10. An individual plate element for the purpose described having a centrally disposed opening, eccentrically disposed openings, flanges formed around the last named openings on one side of said plate, radial passages of varying width formed between said flanged openings, flanges formed around said centrally disposed opening and around the exterior edge on the opposite side of said plate.

11. An apparatus for the transmission or exchange of heat between fluids, comprising in combination an outer casing, a plurality of independent and removable heat exchanging elements located within said casing, each of such heat exchanging elements comprising a plurality of plates, means for securing such plates in assembled relation, a centrally disposed passage formed in such assembled plates, eccentrically disposed passages formed in such assembled plates, passages of varying area formed in such assembled plates approximately at right angles to said centrally and eccentrically disposed passages whereby one fluid is caused to circulate through said eccentrically disposed passages and a second fluid is caused to pass between said outer casing and centrally disposed passage through said passages of varying area, an inlet pipe for the fluid passing through said eccentrically disposed passages passing through said outer casing and connected to said heat exchanging elements, outlet pipes connected to said heat exchanging elements and passing through said outer casing, an inlet connection formed on said outer casing for the fluid passing through the passages of varying area formed in said heat exchanging elements, outlet pipes connected to said heat exchanging elements for removing said fluid and means for enabling any of such heat exchanging elements to be disconnected for the purpose described.

In witness whereof I have hereunto set my hand in the presence of two subscribing witnesses.

ALBERT DEX HARRISON.

Witnesses:
ERNEST HARPER,
KATHLEEN M. THOMPSON.